(12) United States Patent
Bruck et al.

(10) Patent No.: US 9,815,139 B2
(45) Date of Patent: Nov. 14, 2017

(54) METHOD FOR PROCESSING A PART WITH AN ENERGY BEAM

(71) Applicant: Siemens Energy, Inc., Orlando, FL (US)

(72) Inventors: Gerald J. Bruck, Oviedo, FL (US); Ahmed Kamel, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 677 days.

(21) Appl. No.: 14/161,096

(22) Filed: Jan. 22, 2014

(65) Prior Publication Data

US 2015/0202716 A1 Jul. 23, 2015

(51) Int. Cl.
*B23K 26/06* (2014.01)
*B22F 5/04* (2006.01)
(Continued)

(52) U.S. Cl.
CPC ........ *B23K 26/0661* (2013.01); *B22F 3/1055* (2013.01); *B22F 5/04* (2013.01); *B29D 99/0025* (2013.01); *F01D 15/10* (2013.01); *B29C 64/153* (2017.08); *B33Y 10/00* (2014.12); *Y02P 10/295* (2015.11)

(58) Field of Classification Search
CPC ........ B22F 3/1055; B22F 5/04; B23K 26/066; B23K 26/0661; B29C 67/0077; B33Y 10/00; Y02P 10/295
See application file for complete search history.

(56) References Cited

U.S. PATENT DOCUMENTS 4,818,562 A 4/1989 Arcella et al.
5,318,869 A * 6/1994 Hashimoto ............... G03F 1/72
378/35
(Continued)

FOREIGN PATENT DOCUMENTS

CN 101090787 A 12/2007
CN 102029390 A 4/2011
(Continued)

OTHER PUBLICATIONS

Machine translation of Japan Patent document No. 8-148,803, May 2017.*

(Continued)

*Primary Examiner* — Geoffrey S Evans

(57) ABSTRACT

A method for processing a part (10) with an energy beam A mask (70, 80) is arranged between a source of the energy beam and the part. The mask is configured with a beam-transmissive portion (71) in correspondence with mutually opposed portions (12, 14) of the part. Simultaneously heating the mutually opposed portions of the part is performed with energy beamlets passing through the beam-transmissive portions of the mask This simultaneous heating is configured to keep a thermally-induced distortion of the part within a predefined tolerance. Scanning of the mask with the energy beam may be performed without precisely tracking the mutually opposed portions of the part, thereby avoiding a need for complicated numerical programming for tracking a relatively complex geometry defined by the mutually opposed portions of the part.

9 Claims, 2 Drawing Sheets

(51) Int. Cl.
   *B22F 3/105*   (2006.01)
   *F01D 15/10*   (2006.01)
   *B29D 99/00*   (2010.01)
   B33Y 10/00     (2015.01)
   B29C 64/153    (2017.01)

(56) References Cited

U.S. PATENT DOCUMENTS

| | | | |
|---|---|---|---|
| 5,985,202 A * | 11/1999 | Ozaki | B23K 26/066 |
| | | | 264/113 |
| 6,531,086 B1 | 3/2003 | Larsson | |
| 2002/0093115 A1 | 7/2002 | Jang et al. | |
| 2005/0268998 A1* | 12/2005 | Bostanjoglo | B22F 3/1055 |
| | | | 148/538 |
| 2007/0057412 A1* | 3/2007 | Weiskopf | B29C 67/0077 |
| | | | 264/497 |
| 2008/0145567 A1* | 6/2008 | Ohmae | H05K 3/0032 |
| | | | 427/554 |
| 2013/0136868 A1 | 5/2013 | Bruck et al. | |
| 2013/0140278 A1 | 6/2013 | Bruck et al. | |
| 2014/0252687 A1* | 9/2014 | El-Dasher | B22F 3/1055 |
| | | | 264/497 |
| 2015/0132173 A1* | 5/2015 | Bruck | B23P 6/007 |
| | | | 419/1 |
| 2016/0136730 A1* | 5/2016 | McMurtry | G02B 26/101 |
| | | | 425/162 |

FOREIGN PATENT DOCUMENTS

| | | |
|---|---|---|
| CN | 102712066 A | 10/2012 |
| CN | 103328150 A | 9/2013 |
| DE | 19953000 A1 * | 5/2001 |
| FR | 2962357 A1 * | 1/2012 |
| JP | 60-44194 A * | 3/1985 |
| JP | 8-148803 A * | 6/1996 |
| JP | 2002-292488 A * | 10/2002 |
| JP | 2009-6509 A * | 1/2009 |
| WO | WO-2012-150926 A * | 11/2012 |

OTHER PUBLICATIONS

Machine translation of Japan Patent document No. 2002-292,488, May 2017.*

* cited by examiner

METHOD FOR PROCESSING A PART WITH AN ENERGY BEAM

FIELD OF THE INVENTION

The present invention is generally related to manufacturing techniques for forming or repairing a part, such as airfoils for blades or vanes for a combustion turbine engine; and, more particularly, to a method for processing a part involving use of an energy beam, such as a laser beam.

BACKGROUND OF THE INVENTION

Combustion turbine engines, such as gas turbine engines, typically include a turbine section having alternating arrangements of parts, such as rotatable blades and stationary vanes. A flow of hot gases from a combustor section expands against respective airfoils of the blades and vanes to rotationally drive the blades in the turbine section, where mechanical energy is extracted to turn a shaft, which may power a compressor section of the turbine engine.

During engine operation, the hot gases produce an environment that corrosively attacks the surfaces of the blades and vanes and often results in oxidation and corrosive pitting. The hot gases, soot from combustion, particles within the flow of hot gases, and other foreign objects also wear against the turbine blades and vanes and erode the surfaces of the blades, vanes, and other turbine engine components, which may undesirably reduce the useful life of the blades or vanes. Additionally, the tip region (e.g., a squealer tip) of the turbine blades is often subjected to a substantial amount of wear. For example, the blade tip may be abraded when it rubs up against a shroud of a casing in which the turbine blade rotates. High temperatures and stresses further degrade such components by thermo-mechanical fatigue (TMF) and result in cracking of parts that are subjected to such loadings It is known to use laser-based processes for forming or repairing such parts of turbine engines United States Patent Application Publication No. US 2013/0136868 A1, authored by the present inventors, discloses improved methods for depositing superalloy materials that are otherwise difficult to weld. Those methods include the laser melting of powdered superalloy material together with powdered flux material to form a melt pool under a layer of protective slag. The slag performs a cleaning function in addition to protecting the molten alloy material from the atmosphere. Upon solidification, the slag is removed from the newly deposited superalloy material to reveal a crack-free surface and deposit. Such methods have been shown to be effective even for superalloy materials which are beyond the traditional region of weldability.

BRIEF DESCRIPTION OF THE DRAWINGS

The invention is explained in the following description in view of the drawings that show.

DETAILED DESCRIPTION OF THE INVENTION

Figure 5:
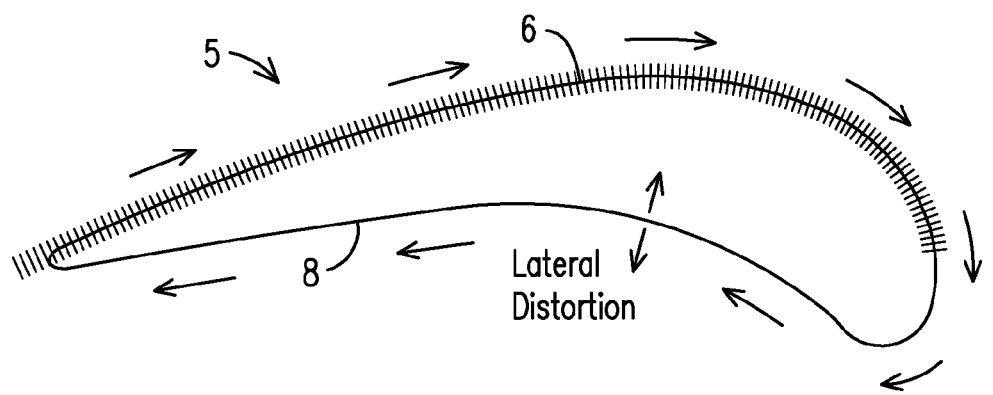
FIG. 5 is a schematic representation of a known laser processing technique that can introduce lateral distortion in the part being processed

The present inventors have innovatively recognized certain limitations in connection with known techniques that utilize a beam of energy, e.g., lasing energy or other modalities of energy, for processing a part that may involve a relatively complex geometry For example, airfoils of blades, vanes, etc, that may be used in a combustion turbine engine involve such complex geometries. Non-limiting applications may include various additive manufacturing processes, including without limitation laser cladding, selective laser melting (SLM) or selective laser sintering (SLS) as may be used to deposit a layer of superalloy powder particles onto a superalloy substrate, etc Using a known process as schematically illustrated in FIG. 5, when repairing or forming an airfoil 5, a laser beam may be used to track a path including a convex-shaped edge 6 of the airfoil 5 followed by a concave-shaped edge 8 of the airfoil 5. The present inventors have found, however, that the beam may miss the desired target area to be processed because of lateral distortion that may be induced in the airfoil 5 due to a thermal differential that arises between edges 6, 8 of the airfoil during the laser tracking process. In this example, since convex edge 6 is processed by the laser beam before concave edge 8, then convex edge 6 would be at a relatively higher temperature relative to concave edge 8. Similarly, lateral distortion would also arise in the part if concave edge 8 was processed before convex edge 6.

Figure 1:
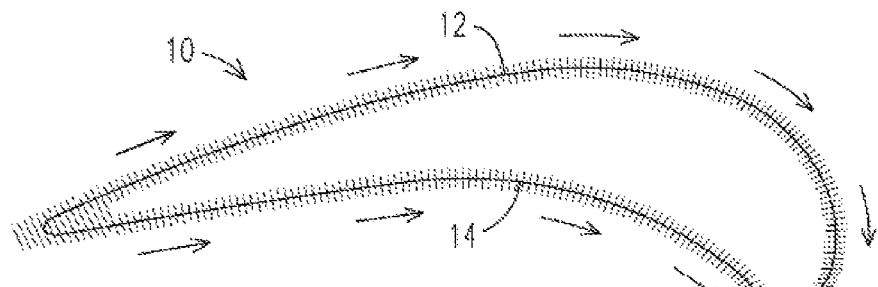
FIG. 1 is a schematic representation for conceptualizing methodology for processing a part with an energy beam. The part may be an airfoil of a blade or a vane for a combustion turbine engine, where, for example, opposed portions of the part may be simultaneously heated in accordance with aspects of the present invention, and, consequently, thermally-induced geometric distortions may be kept within a predefined tolerance.

In view of such recognition, the present inventors propose an innovative technique for processing a part with an energy beam, where such lateral distortion in the part can be avoided or may be kept within a predefined tolerance As conceptually illustrated in FIG. 1, mutually opposed portions of the part, such as convex and concave edges 12, 14 of a part 10 may be simultaneously heated. In this case, thermal expansion and contraction of a metal alloy constituent of the part is balanced between the mutually opposed portions of the part, and this is effective to keep the thermally-induced distortion of the part within a predefined tolerance. In one example embodiment, this simultaneous heating of the mutually opposed portions of the part may be accomplished without use of complicated numerical programming for precisely tracking the mutually opposed portions of the part or laser power coordination; or use of costly part-maneuvering equipment In the following detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments In other instances, methods, procedures, and components, which would be well-understood by one skilled in the art have not been described in detail to avoid unnecessary and burdensome explanation Furthermore, various operations may be described as multiple discrete steps performed in a manner that is helpful for understanding embodiments of the present invention. However, the order of description should not be construed as to imply that these operations need be performed in the order they are presented, nor that they are even order dependent unless otherwise so described Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated In the embodiments illustrated in FIGS. 2 and 3, a mask 70 may be arranged between a source of the energy beam (e.g., a laser beam) and the part As may be appreciated in FIGS. 2 and 3, mask 70 (e.g., a static mask) may include a beam-transmissive portion 71 having a geometric shape in correspondence with the mutually opposed portions of the part being processed, such as the tip edge region of an airfoil for a turbine blade Simultaneous heating of the mutually opposed portions of the part being processed is thus accomplished with energy beamlets passing through beam-transmissive portion 71. In one example embodiment, the mask 70 may be scanned with the energy beam so that energy beamlets passing through the beam-transmissive portion of the mask can simultaneously heat the mutually opposed portions of the part. It should be appreciated that a beamlet, as disclosed herein, may be a subset, e.g., small portion, of the energy beam passing through the beam transmissive portion 71. For example, as a wide dimension energy beam is projected over the mask 70, the wide dimension energy beam would be subdivided into energy beamlets wherever the beam is allowed to pass through the beam-transmissive portion 71. This scanning may be performed without precisely tracking the mutually opposed portions of the part. This would avoid a need for complicated numerical programming for tracking the relatively complex geometry defined by the mutually opposed portions of the part In one example, embodiment, mask 70 may be made of a laser energy tolerant material that is opaque relative to a laser beam 20. Such materials may include graphite which is opaque to a wide range of laser beam wavelengths. Copper may also be used, but may be reflective to a laser beam so the angle at which the laser beam impinges the masking beam should be adjusted to avoid back reflection to laser optics Although the description below refers to a single laser beam 20, it will be appreciated by those skilled in the art that the laser beam which is directed toward the mask 70 may comprise a combination of multiple laser beams either from multiple sources, or from a single laser source where the beam is split into multiple beams.

Figure 2:
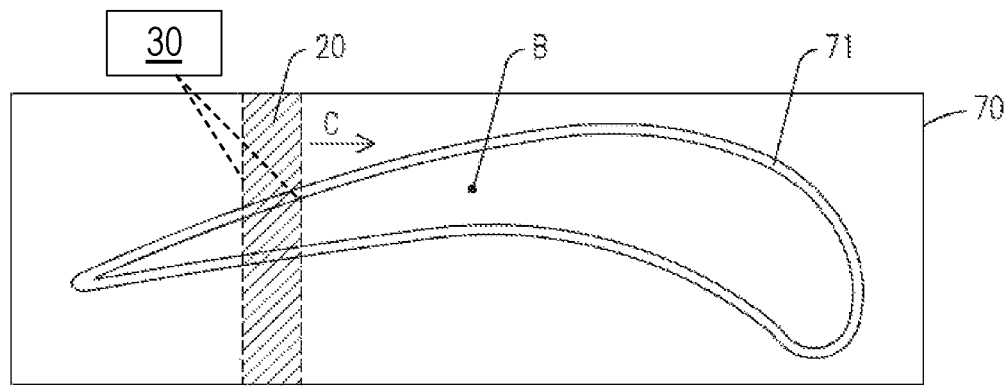
FIG. 2 is a schematic representation of a masking element for processing the part with an area energy beam, such as a laser beam, where the masking element may allow a fixed-width laser beam to simultaneously heat mutually opposed edges of the part
Figure 3:
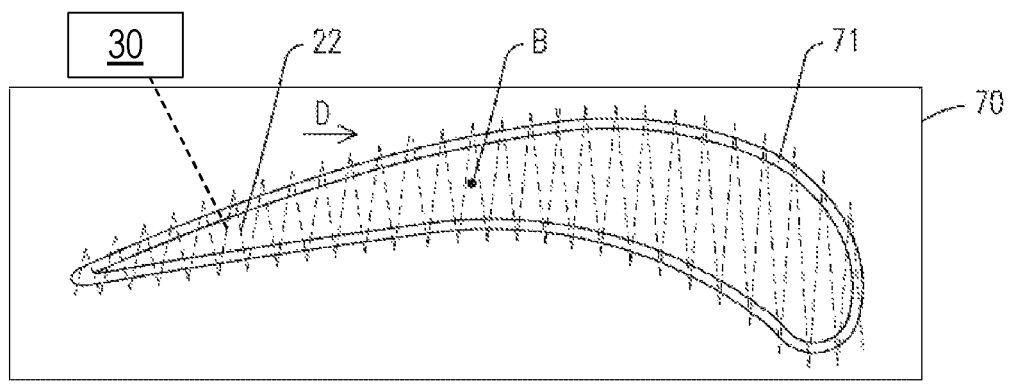
FIG. 3 is a schematic representation where the masking element may allow a point laser beam with a variable rastering width to simultaneously heat the mutually opposed edges of the part.

As illustrated by way of example in FIG. 2, an area energy beam 20 from an energy source 30, such as may be produced by a diode laser, may be scanned from left to right as indicated by arrow C. Alternate to moving beam and stationary part, the same processing may be accomplished with stationary laser beam and part moved from right to left. As further shown, a width dimension of beam 20 may be maintained generally constant to encompass at least a maximum width of the profile defined by beam-transmissive portion 71. Alternatively, as illustrated in FIG. 3, a point energy beam 22 may be rastered along a width dimension of the mask 70 and may have a predefined variable-width as rastered beam 22 scans the mask 70 in the direction of arrow C. This predefined variable width may be chosen to overshoot by a predefined margin a varying width of the profile defined by the beam-transmissive portion 71.

Mask 70 may be a single masking element that is held stationary, or it may be moveable between passes of the energy beam as the part 10 is repeatedly heated in layers, such as during an additive manufacturing process By way of example, airfoils for a turbine vane or blade may define a gradual twist from the platform to the tip of the blade or vane Accordingly, masking element 70 may be rotated around a central axis "B" as the airfoil is developed.

Figure 4:
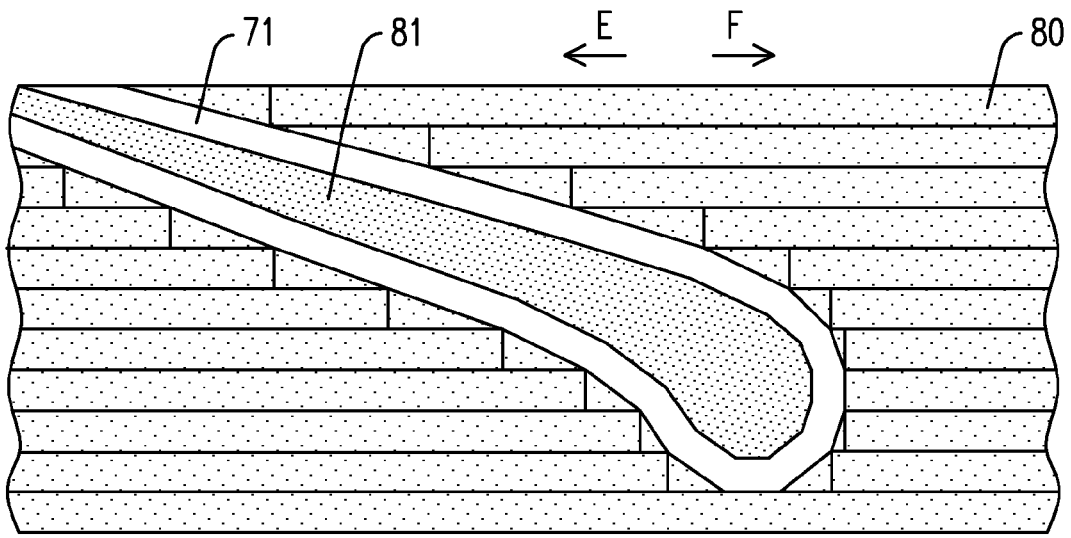
FIG. 4 is a schematic representation of an embodiment including a plurality of masking elements arranged side-by-side on a common plane, where at least some of the masking elements may be adjustable to define a beam-transmissive portion to be in correspondence with the mutually opposed portions of the part.

With respect to FIG. 4, an example embodiment is depicted where the mask comprises a plurality of masking elements 80 that may be arranged side-by-side on a common plane The masking elements 80 may take the form of graphite rods with beveled ends to achieve the desired shape or configuration for the beam-transmissive portion 71. In this example, the rods or masking elements 80 may be operatively connected to a control mechanism to move the masking elements 80 laterally (as conceptually represented by arrows "E" and "F") in accordance with the configuration of the mutually opposed portions of a part being formed or repaired. In this example embodiment, a core 81 masking element may be provided to account for a hollow interior of the airfoil, and may be stationary or moveable in accordance with a predetermined shape of the airfoil. In other embodiments, portions of the mask may be located in different planes perpendicular to the beam direction, with variable overlapping of the portions being used to define a variable shape in the transmissive portion 71

While various embodiments of the present invention have been shown and described herein, it will be apparent that such embodiments are provided by way of example only. Numerous variations, changes and substitutions may be made without departing from the invention herein Accordingly, it is intended that the invention be limited only by the spirit and scope of the appended claims.

The invention claimed is:

1. A method for processing a part with an energy beam, the method comprising:
    arranging a mask between a source of the energy beam and the part;
    configuring the mask with a beam-transmissive portion in correspondence with mutually opposed portions of the part;
    simultaneously heating the mutually opposed portions of the part with energy beamlets passing through the beam-transmissive portion of the mask, wherein the simultaneous heating is configured to keep a thermally-induced distortion of the part within a predefined tolerance; and
    forming the energy beamlets passing through the beam-transmissive portion of the mask from at least one point energy beam rastered along a width dimension of the mask, and having a predefined variable width.

2. The method of claim 1, wherein the predefined variable width of the rastered energy beam is chosen to overshoot by a predefined margin a varying width of a profile defined by the beam-transmissive portion in correspondence with the mutually opposed portions of the part.

3. The method of claim 1, wherein the mask comprises a plurality of masking elements arranged side-by-side on at least one common plane, wherein the configuring of the mask comprises adjusting respective positions of at least some of the plurality of masking elements to define the beam-transmissive portion to be in correspondence with the mutually opposed portions of the part.

4. A method for processing a part with an energy beam, the method comprising:
   arranging a mask between a source of the energy beam and the part;
   configuring the mask with a beam-transmissive portion in correspondence with mutually opposed portions of the part; and
   scanning the mask with the energy beam so that energy beamlets pass through the beam-transmissive portion of the mask for simultaneously heating the mutually opposed portions of the part, wherein the simultaneous heating is configured to keep a thermally-induced distortion of the part within a predefined tolerance, wherein the scanning is performed without precisely tracking the mutually opposed portions of the part.

5. The method of claim 4, wherein the scanning is arranged to scan the mask with an area energy beam having a fixed width to form the energy beamlets that pass through the beam-transmissive portion of the mask.

6. The method of claim 5, wherein the fixed width of the area beam is chosen to encompass at least a maximum width of a profile defined by the beam-transmissive portion in correspondence with the mutually opposed portions of the part.

7. The method of claim 4, wherein the scanning is configured to scan the mask with at least one point energy beam rastered along a width dimension of the mask, the rastered energy beam having a predefined variable width to form the energy beamlets that pass through the beam-transmissive portions of the mask.

8. The method of claim 4, wherein the predefined variable width of the beam is chosen to overshoot by a predefined margin a varying width of a profile defined by the beam-transmissive portion in correspondence with the mutually opposed portions of the part.

9. The method of claim 4, wherein the mask comprises a plurality of masking elements arranged side-by-side on at least one common plane, wherein the configuring of the mask comprises adjusting respective positions of at least some of the plurality of masking elements to define the beam-transmissive portion to be in correspondence with the mutually opposed portions of the part.

* * * * *